BEST AVAILABLE COPY

Examiner

4 Sheets—Sheet 1.

J. B. EADS.

(38038)

Operating Heavy Ordnance.

No. 1,812.

Reissued Nov. 8, 1864.

Witnesses;
Henry W. Price
John A. Malley

Inventor;
James B. Eads
By Edw. A. B. Stringham

K. PETERS, PHOTO-LITHOGRAPHER, WASHINGTON, D. C.

4 Sheets—Sheet 2.

J. B. EADS.

Operating Heavy Ordnance.

No. 1,812.

Reissued Nov. 8, 1864.

Witnesses:
Henry V. Price
John Mahy

Inventor:
James B. Eads
By his Atty. N. B. Stoughton

H. PETERS, PHOTO-LITHOGRAPHER, WASHINGTON, D. C.

J. B. EADS.
Operating Heavy Ordnance.
No. 1,812. Reissued Nov. 8, 1864.
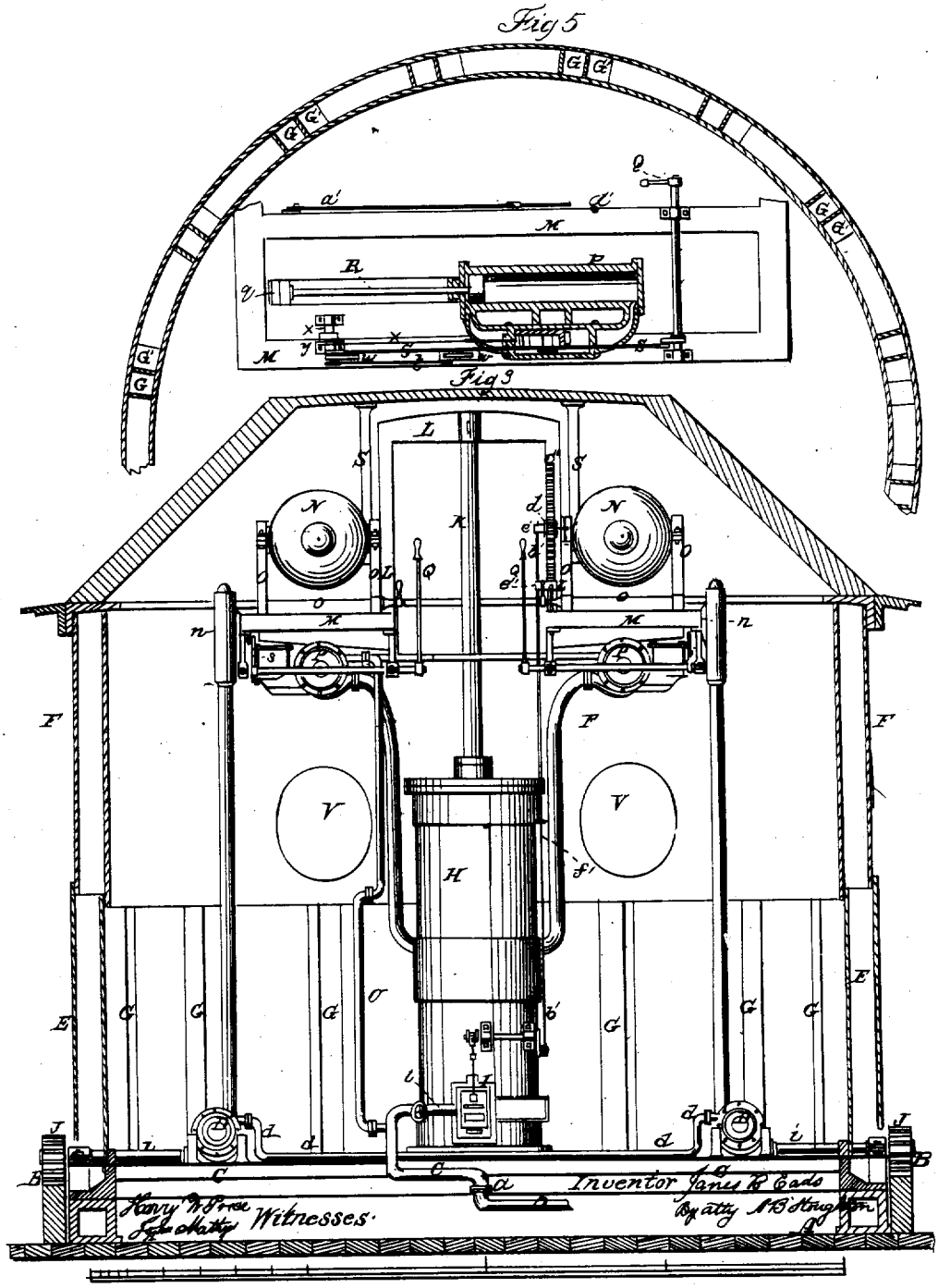
N. PETERS, PHOTO-LITHOGRAPHER, WASHINGTON, D. C.

J. B. EADS.
Operating Heavy Ordnance.
No. 1,812. Reissued Nov. 8, 1864.
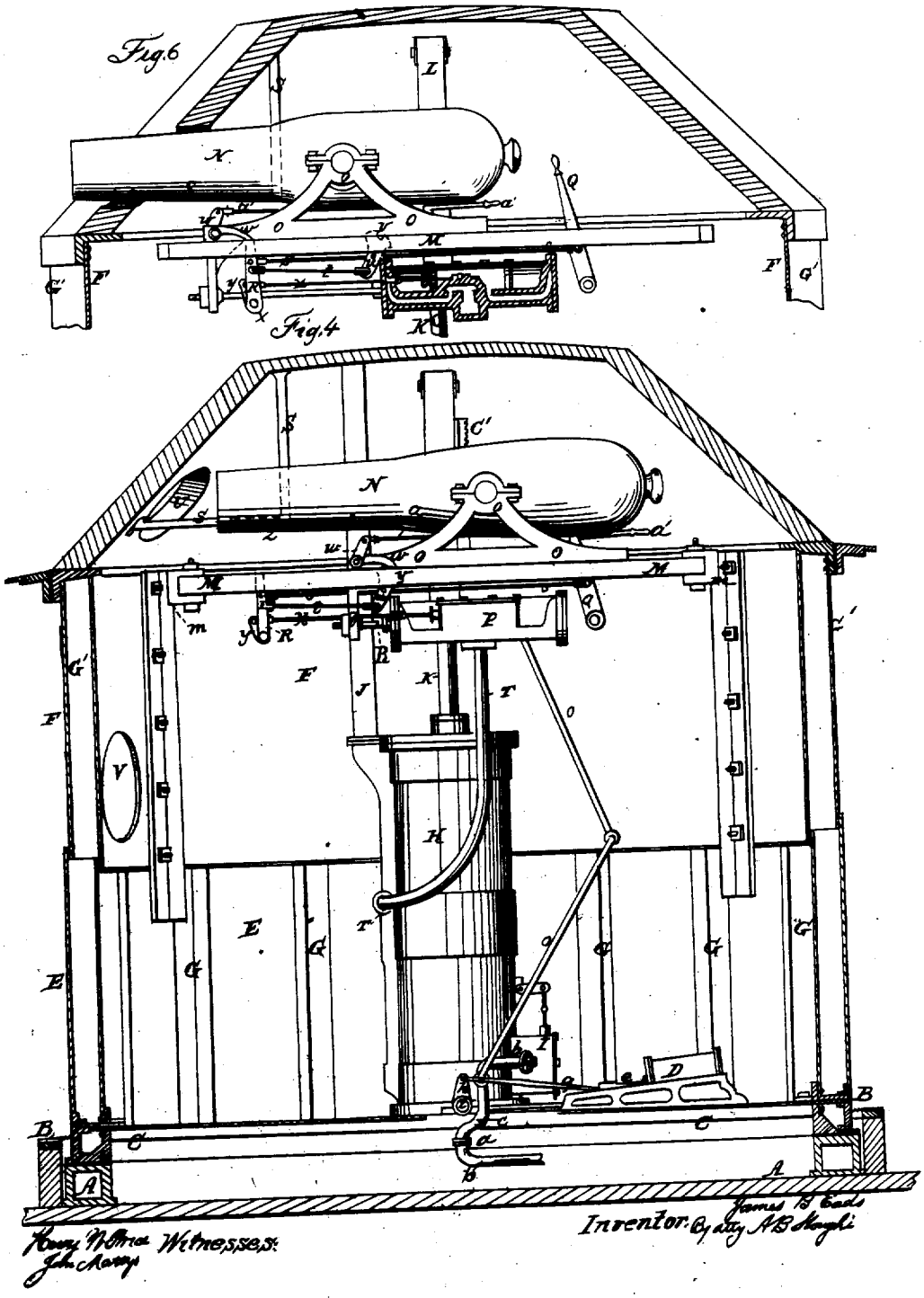
Witnesses:
Henry Mellen
John Kemp
Inventor: James B. Eads
By Atty A. B. Maghi
N. PETERS, PHOTO-LITHOGRAPHER, WASHINGTON, D. C.

UNITED STATES PATENT OFFICE.

JAMES B. EADS, OF ST. LOUIS, MISSOURI.

IMPROVEMENT IN OPERATING GUNS AND GUN-TOWERS.

Specification forming part of Letters Patent No. 38,038, dated March 31, 1863; Reissue No. 1,536, dated September 15, 1863; Reissue No. 1,812, dated November 8, 1864.

DIVISION F.

*To all whom it may concern:*

Be it known that I, JAMES B. EADS, of the city and county of St. Louis, and State of Missouri, have invented certain new and useful improvements in the construction and operation of shot-proof gun-towers, the elevating and depressing, the running out and in, and the taking up of the recoil of the gun or guns therein by the use of steam; and I do hereby declare that the following is a full, clear, and exact description of the same, reference being had to the accompanying drawings, making a part of this specification, in which—

Figure 1:
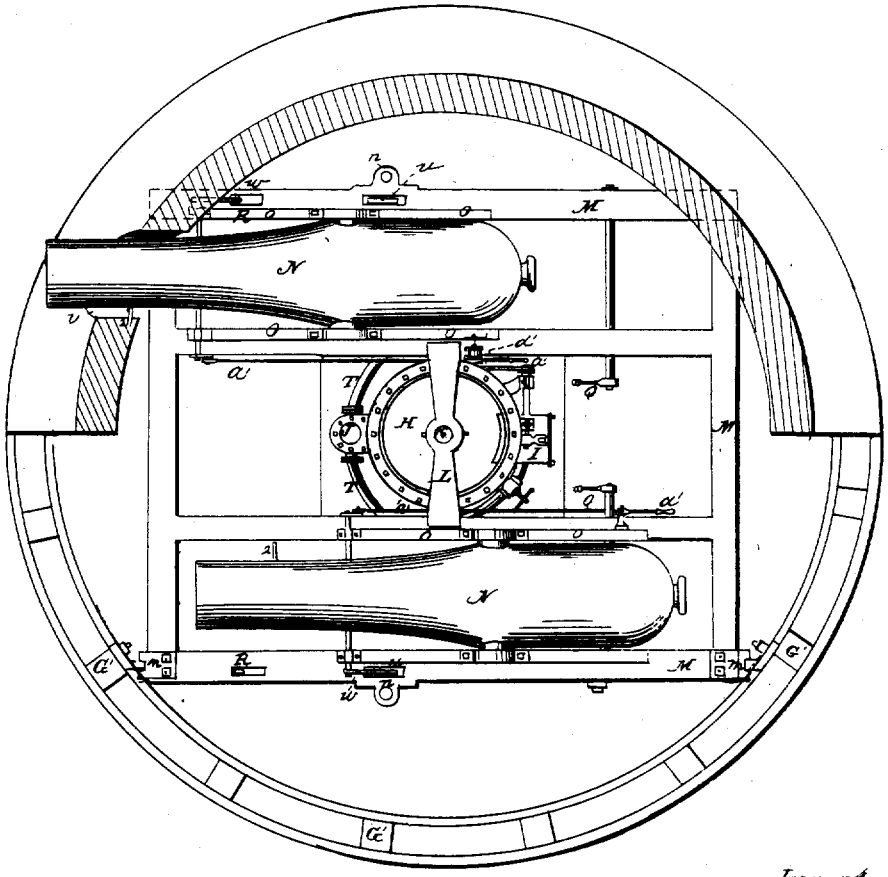
Figure 2:
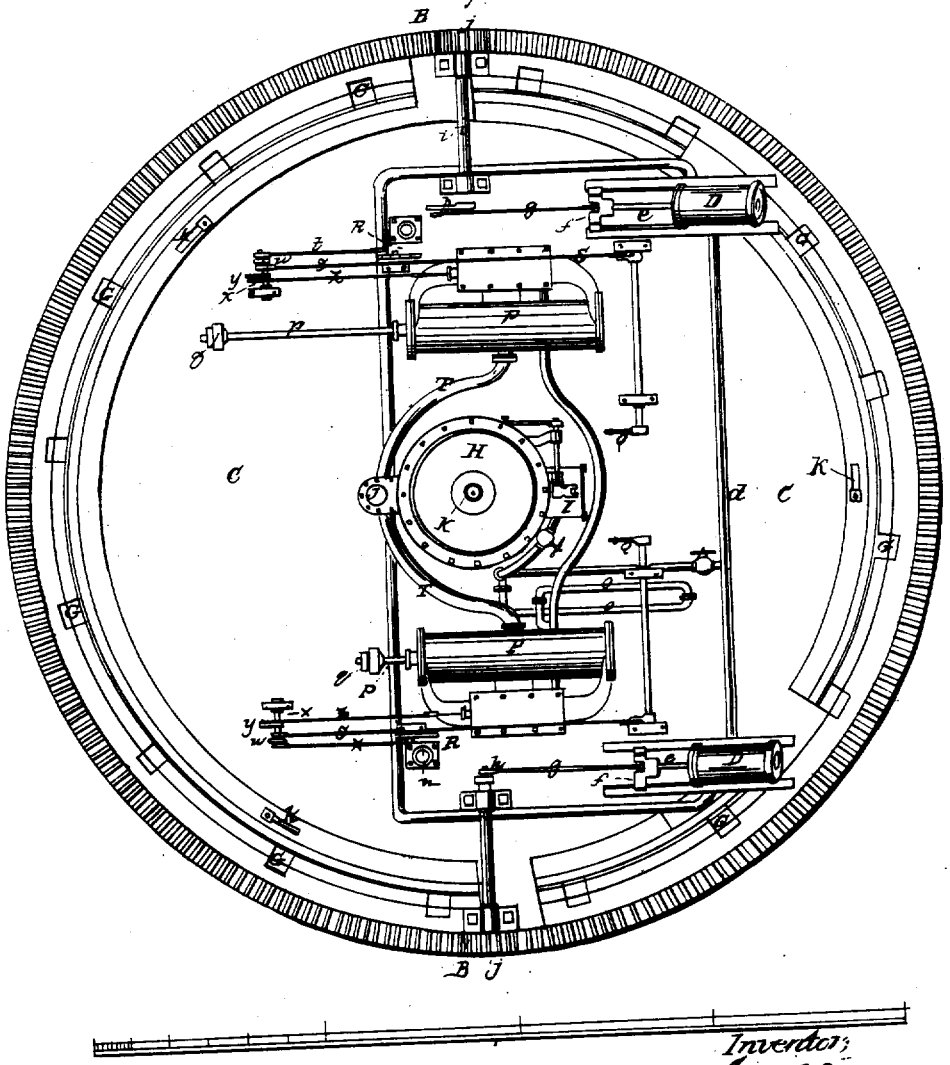

Figure 1 represents a top plan of a portion of a revolving tower with the guns arranged therein, together with the steam-cylinder and appliances by which they are worked. Fig. 2 represents a top view of a portion of the revolving tower and the steam-cylinders, by which it, as well as the guns, are to be operated, the guns being removed, to better show the mechanism below them. Fig. 3 represents a vertical section through the tower, and showing an elevation of the hoisting and lowering steam-cylinder, the guns and gun-frame, and the parts connected therewith, looking toward the breech of the guns. Fig. 4 represents a similar vertical section taken at right angles to the section, Fig. 3, and looking toward the sides of the gun. Figs. 5 and 6 represent detached portions of the tower, guns, steam-cylinder, and the mechanism connected thereto, the former being a horizontal and the latter a vertical section through the gun steam-cylinder—that is to say, the cylinder for running the gun out of or into the port and for taking the recoil thereof when the gun is discharged.

Similar letters of reference, where they occur in the several figures, denote like parts in all the drawings.

I am aware that guns have been raised up from the hold of a vessel by steam, to be fired, and lowered again by steam into the hold. I am also aware that a revolving metallic gun-tower has been used. I do not claim either of these things.

The object and purpose of this part of my invention consists in making a gun-tower in sections, so that one section may drop into or around the section below it, and thus bring the weight below decks and better trim the vessel for steaming or sailing.

To enable others skilled in the art to make and use my invention, I will proceed to describe the same with reference to the drawings.

Upon a ship's bottom or platform, A, is placed a circular rack, B, within which the base C of the tower may turn or work. On this base C the steam-cylinders, guns, and the several mechanical appliances for working the tower and the guns are placed. The steam to work the several parts or to supply the several cylinders may come from one source and through one pipe from the boiler or boilers to a point directly under the center of the tower, as at *a*, where there should be a turning steam-joint, to allow the tower and all its connections to turn freely around without injury to the steam-pipe *b*, which is stationary. From the joint *a*, the steam-pipe *c* supplies all the steam pipes and cylinders, there being of course the usual cocks for regulating and directing or for cutting off the steam, which it is unnecessary to describe in detail further than where they constitute a part of the invention claimed. The steam-pipe *d* furnishes steam to the cylinders D through steam-chests of the ordinary kind, and the piston-rod *e* of these cylinders connect with cross-heads *f*, to which the ends of the connecting-rod *g* are attached, the other ends of said rods connecting with a crank, *h*, on the ends of the shaft *i*. The shafts *i* have each a pinion, *j*, which works in the circular stationary rack B to turn the tower, and as the cylinders are attached to the bed or base C, that carries the tower, they are all turned around by these pinions *j* when the cylinders are worked.

Instead of two cylinders to turn the tower, one only may be used by extending the pinion-shaft clear across the base, and introducing an additional pinion, so that the two, working in the circular rack, shall both tend to turn the tower in the same direction—which they would not do if both were on the same shaft, and no intermediate gear introduced. The other cylinder, if not dispensed with, may be used for working a fan-blower to ventilate the tower. The tower I propose to make in two sections, E F, so that the upper one can drop into or around the lower section, and by this means I can let the upper and top-heavy portion of the tower down into the hold of the vessel, and thus better trim it for sailing or steaming.

In the interior of the section E of the tower are bolted vertical ribs or supports G, so arranged that when the section F is raised up, and the section E slightly turned so as to bring its ribs or supports directly under the ribs or supports of the other section, F, and the section F be lowered, it will be sustained on top of the ribs G. The slots and set-screws at *k*, Fig. 2, admit of this movement of the under section, so as to catch and hold the upper section, by turning it in one direction, or allow it to descend, telescopic fashion, by turning it in an opposite direction, and in addition to the slots and set-screws *k* other devices may be used on the ribs themselves, or near to them, for stopping the partial rotation of the lower section at the proper point, and making a firm support to the upper section.

At the center of the base C is arranged a vertical steam-cylinder, H, furnished with a steam-chest, I, and the necessary valves and ports for the inlet and exit of the steam, which is conducted thereto by the steam-pipe *l*, the exhaust being received in the pipe J, whence it may be escaped to any suitable position or place, or be returned to the condenser by another pipe jointed like that at *a*.

On top of the piston K, that works in the cylinder H, there is a cross-head, L, to which is secured a gun-frame, M, carrying in this case two guns, N N. More or less may be used; but I prefer two. The gun-frame M, as it is raised or lowered by the piston K, is guided in its movements at its four corners, as at *m*, Figs. 1 and 4, and also at *n*, Figs. 1 and 3, by guide-rods fixed to the bed, and long sleeves upon the gun-frame, to prevent it from vibrating against the tower, and to cause it to move freely and easily. Upon this gun-frame M are mounted the gun-carriages O O, each carrying its own gun N, and so that they may be moved upon the gun-frame independently of each other and of the gun-frame, as follows: Underneath the gun-frame M are two steam-cylinders, P—one on each side thereof—and so that each gun may be worked by its own cylinder. Steam is introduced to these cylinders from the common supply-pipe by means of the jointed pipes *o o*, and suitable valves and ports connected therewith. The piston-rods *p* of these cylinders are connected directly with their respective gun-carriage through a projecting arm, *q*, so that the guns may be run out into their ports by steam or back again when necessary. The steam-cylinders P also take the recoil of their respective guns as follows: The starting-bar Q has a rod, S, connected to it by one of its ends, the other end being attached to a pivoted arm, R, the point of which, when vertical, extends up through the gun-frame M, and in close proximity to the path of the gun-carriage. To this lever or arm R is connected, by a rod, *t*, a pivoted arm, *u*, having a recess, *v*, in it. This arm *u* also projects up through the gun-frame M, and in close proximity to the path of the gun-carriage O, so that it, as well as the arm R, may be actuated by a hooked lever, *w*, that is connected to the gun-carriage. The shaft *x*, to which the arm R is hung, has upon it a short arm, *y*, and to this arm the valve-rod *z* is attached, so that the arm R, whether it be worked by the starting-bar Q or be moved by the arm or lever *w* on the gun-carriage, opens or closes the respective ports of the cylinders P, as the case may be. The arm or lever *w* has a rod, *a'*, connected to it which extends back toward the position or stand of the engineer or gunner, so that in case it might be necessary to run the gun back by steam without firing it, the said arm or lever *w* may be thrown out of action with regard to the arms R or *u*, to prevent it from moving the steam-valve as the carriage is run back.

In Figs. 5 and 6 the several parts connected with the gun are shown in the positions they occupy when the gun has been run out of its port by steam to be fired, the steam being behind the piston in the cylinder P, and the valve being in the position shown in Fig. 6. At the moment of explosion in the gun, the gun and carriage recoil, and the lever *w* being against the arm R, it moves said arm and the valve-rod *z*, connected to it, opening the exit-port and allowing the steam to escape from the cylinder. When the gun and its carriage and the lever *w* connected to the carriage have receded to near the limit of the recoiling distance, the lever *w* drops into the recess *v* of the arm *u*, and moving said arm, it, through its connecting-rod *t*, moves the arm R, which works the slide-valve and opens the inlet-port, and the steam, rushing in against the piston, checks it, as well as the gun-carriage and gun, the force and elasticity of the steam both tending to check the recoil. Should the gun and its carriage react or recoil again, the lever *w*, moving in a contrary direction, and being still in connection with the arm *u*, or so that it will connect with said arm in passing over it, will shift the valve and allow the steam to oppose the recoil or reaction from the opposite side or direction. As the cylinders P P rise and descend with the guns or gun-frame, their steam-pipes are made with joints, to admit of this action or motion. The exhaust-steam from the cylinders P may pass to the main exhaust-pipe J, through steam-pipes T T, which should also be jointed, or through flexible pipes of rubber. As the gun-frame is raised up, the breech of the guns being the heaviest, their muzzles will be the most elevated, and when the guns arrive at the height of the port in the tower a projection or trunnion, 2, on the side of the gun near its muzzle, comes against a guide-bar, *s*, connected to the tower or its dome, and stopping the point of the gun, while the breech continues to rise until it becomes level therewith, or at such elevation as may be desired, so that when run out by the force of the steam it will fairly and accurately enter its port, which may, by this arrangement, be very small. If it is desirable to lower the upper section of the tower, it may be done at the same time that the guns are lowered, as follows: Place two or more braces upon the gun-frame, with their upper ends against the top of the gun-tower, then slightly start up the gun-frame by its cylinder or engine, which will raise up the upper section of the gun-tower sufficient to allow the lower section to be moved far enough to allow the ribs or supports of each to pass by each other. The upper section of the tower, the guns, and the gun-frame are all then supported upon the column of steam in the cylinder H, and by exhausting that steam the whole may be lowered into the hold of the vessel, and the whole can be raised up again by letting in the steam, and after the top section is up and its under supports properly adjusted to it, the gun-frame can be lowered to release the temporary braces, which may then be removed, and the gun-frame can be raised and lowered at pleasure without disturbing the upper section of the tower, and the guns and gun-frame may be let down and raised up separately, as will be hereinafter described.

That there may always be a supply of steam in the cylinder H, to keep the gun-frame and the guns up to the proper and adjusted height, I connect to the slide-valve of the steam-chest I a rod, *b'*, Fig. 3, which extends up to the stand or position of the engineer or operator, and by which he may operate said slide-valve.

Upon the cross-head L there is a rack, *c'*, in which a pinion, *d'*, can roll, said pinion being held to the rack and the cross-head by a stirrup or clip passing around the cross-head. The rod *b'* passes through a guide, *e''*, connected to the pinion-frame, and may be clamped or secured to it by a spring-latch or otherwise, so that if the gun-frame should descend the least preceptible distance, from the want of a supply of steam in the cylinder H, it would in dropping carry down the rod *b'*, which in turn would open the inlet-port into the cylinder, causing the piston and its load to rise, and when it had arisen to its proper position the rod would close the inlet-port. Thus the gun-frame may be made the means of holding itself at the adjusted or proper height by supplying steam when required, and shutting it off when not required.

When the guns are to be loaded, the gun-frame is lowered until the muzzles of the guns come opposite to the openings V, where the guns can be run out to be loaded, or through which openings they may be recharged without running them out.

The tower may rest and turn upon friction-rolls or upon greased ways without the rolls. Of its ventilation it is not necessary to speak further than that it is best done by a fan-blower or exhauster worked from an engine, either in the tower or elsewhere. The necessary peep-holes may also be furnished to enable the operator or the "lookout" to see the objects at which the guns are to be fired.

The thickness of the metal in the tower may be increased to any extent, limited only by the power of the engine to move it and the capacity of the vessel to float it.

By disconnecting the piston-rod K from its cross-head after the gun-frame and guns have been lowered into the hold, the upper section of the tower may be lowered and raised by the piston-rod without the guns and their appendages, which, if together, might require more power than would be desirable to have in the cylinder H for working the guns.

On the rod *b'* there may be a collar, *f'*, adjustable or permanent, against which the guide *e''* may strike should the gun-frame by any accident be let suddenly down, and thus the steam would be let in below the piston to catch and hold up the guns and frame.

The guns are leveled by steam in the act of raising them, so as to fairly run out into their ports, their points or muzzles being stopped by their side tripping-pin, 2, coming against the guides *s*, while the height to which the gun-frame rises may be definitely regulated by the contrivances at *c'*, *d'*, and *e''*; and the valve-rod *b'*.

The tower may be cylindrical, conical, or dome-shaped, or parts of each, as may be preferred. To prevent the piston-heads from striking against the ends of the cylinders, should these heavy weights by any accident be suddenly thrust upon the pistons, I propose to so arrange the steam-ports as to prevent all the steam from leaving the cylinder, by making them a few inches from the heads of the cylinders.

If one cylinder should not be deemed sufficient to raise and lower the guns, or the guns and tower, two or more may be used on the revolving base of the tower.

The cylinder H may be stationary and the tower revolve around it, and yet accomplish the end it is designed for—viz., raising and lowering the guns and the tower, or both—in which case the cylinder would be connected with the bottom of the vessel; and though I have only described my invention as applied to vessels, yet I can use it in forts or on land fortifications.

What I claim under this patent is—

Making a gun-tower in sections, so that the top section may be lowered into the hold of the vessel, for the purpose and in the manner substantially as herein described.

JAS. B. EADS.

Witnesses:

GEO. C. FABIAN,

D. W. VAN HOUTEN.